United States Patent [19]

Jorro et al.

[11] 4,026,998

[45] May 31, 1977

[54] CARBON ARTEFACTS

[75] Inventors: Michael Anthony Ambrose Jorro; Terry Dean Rantell; Diana Louise Tosswill, all of Cheltenham, England

[73] Assignees: Coal Industry (Patents) Limited, London, England

[22] Filed: Dec. 2, 1975

[21] Appl. No.: 637,012

[30] Foreign Application Priority Data

Jan. 3, 1975 United Kingdom ............ 00261/75

[52] U.S. Cl. .................................. 423/445; 106/56; 252/502; 264/29.1; 423/448; 423/449

[51] Int. Cl.² .................. C01B 31/02; C01B 31/04

[58] Field of Search ....... 423/445, 448, 449, 447.2; 264/29, 29.1, 29.2, 29.5; 252/502; 106/56; 427/227, 228

[56] References Cited

UNITED STATES PATENTS

| | | | |
|---|---|---|---|
| 3,387,940 | 6/1968 | McHenry et al. | 423/448 |
| 3,407,038 | 10/1968 | Beasley | 423/448 X |
| 3,723,157 | 3/1973 | Druin | 423/447 X |
| 3,853,610 | 12/1974 | Byrne et al. | 264/29 X |
| 3,936,535 | 2/1976 | Boder | 427/228 |

Primary Examiner—Edward J. Meros
Attorney, Agent, or Firm—Stevens, Davis, Miller & Mosher

[57] ABSTRACT

Carbon composites are made by mixing carbonizable binder, calcined coke grist and carbon fibre rods or needles of carbon fibre bundles in a hardened matrix, shaping the mixture into an artefact and carbonizing the binder, optionally with graphitizing. The composites may be used as carbon electrodes and have a low coefficient of thermal expanson.

7 Claims, No Drawings

CARBON ARTEFACTS

This invention concerns the production of carbon or graphite artefacts. In particular, but not exclusively, the invention concerns the production of such artefacts suitable for use as electrodes.

This invention provides a method of producing a composite carbon artefact, comprising the steps of mixing together carbonisable binder, calcined coke grist and carbon fibre rods or needles as hereinafter defined, shaping the mixture into an artefact and carbonising the binder in the shaped artefact to form a composite carbon artefact.

The expression "carbon fibre rods or needles" as herein used refers to rods or needles produced by forming a bundle of carbon fibres, drawing the bundle of fibres through a bath containing a matrix such as a resin or a coal extract or a pitch or a similar material for binding the fibres together and through a forming die, passing the bundle so drawn through a hardening and/or baking region, and cutting the hardened and/or baked bundle into suitable lengths to form the rods or needles.

The matrix, e.g. resin, coal extract, pitch or similar material, may be completely or partially hardened in the hardening and/or baking region. The matrix may be thermoplastic or thermosetting, but if thermoplastic its softening temperature should be above that of the carbonisable binder so that the rods or needles do not lose their integrity during mixing with said binder and the coke grist. Preferably the matrix is a thermosetting resin, e.g. an epoxy resin or more preferably a resin of higher carbon yield when carbonised, such as a phenolic resin.

The carbon fibres employed in the production of the rods or needles may conveniently be made from a solution or extract of coal and by the method described in British Pat. No. 1,315,940 or may conveniently be a commercially available carbon fibre, e.g. a polyacrylonitrile based fibre, such as Courtaulds Grafil A short staple fibre. It is preferred that the carbon fibre rods or needles should consist of at least 30% by volume and preferably more than 50% by volume of carbon fibre. The carbon fibres may be carbonised or graphitised.

The proportion of rods or needles to be used in producing the carbon or graphite artefact may conveniently be between from 1 to 50% by weight of the cold mixture. Preferably the said proportion lies in the range from 1 to 20% by weight.

The carbonisable binders that are generally employed are materials that are liquid or that flow at elevated temperature, so that the artefact may be moulded, but which can be coked or carbonised to form a material consisting essentially of carbon. In general, materials having softening points of from 100° to 140° C are used. The materials generally employed as carbonisable binders are electrode binder pitches, which are bitumens. Alternatively, solutions or extracts of coal may be employed as carbonisble binders. Preferably the amount of carbonisble binder used is from 15 to 35% by weight of the total cold mixture.

The calcined coke grist is manufactured by coking a cokeable feed stock. The feed stock is preferably liquid at the coking temperature thereof. Suitable cokable feed stocks include petroleum pitches or bitumens or a liquid fraction derived from the distillation or fractionation of petroleum, or coal tar pitches. Alternatively, solutions or extracts of coal are also suitable cokable feed stocks. The coke so formed is then broken up and calcined at an elevated temperature such that, and for such time that, the volatile and volatisable matter in the coke is removed. Such temperatures are generally of the order of 1200° C to 1800° C. The calcined coke is then ground to produce the calcined coke grist.

The calcined coke grist, present in the artefact in an amount of from 15–84% by weight, may first be mixed with the carbonisable binder at above the softening point of the binder. The mixture may advantageously then be cooled and, when solid, reground to separate the coated and partially impregnated electrode coke grist particles. The carbon fibre rods or needles, having suitable short lengths, for example 3 to 30 mm long, and of suitable diameter, for example 0.1 to 1 mm, are mixed in, in such a manner that the rods or needles are not seriously damaged. The mixture is then heated and extruded through a die or formed under pressure in a mould at a temperature above the softening point of the binder whereby green shaped artefacts of various desired forms may be produced.

The carbon fibre rods or needles may alternatively be added to the cokable feed stock for manufacturing the calcined coke grist so that the coke forms around the carbon fibre rods or needles. If this is carried out the coke particles are reinforced by the carbon fibre rods or needles. If this method is adopted it may then be necessary to add further coke grist, to which carbon fibre rods or needles have not been added during the manufacture thereof, or additional carbon fibre rods or needles, to the mixture. As a further alternative, the carbonisable binder, the calcined coke grist and the carbon fibre rods or needles are mixed together in a single operation.

The carbonised electrode or other artefact is manufactured from the green shaped artefact by heating the shaped artefact until the binder matrix is carbonised, for example by heating it slowly in an inert atmosphere at up to 1000° C. For the manufacture of electrodes it is generally required that the carbon should be in the form of graphite. The carbonised artefact is heated to a graphitising temperature, generally in the region of 2200° to 2800° C, preferably above 2700° C, in order to convert the carbon into graphite.

By combining hundreds of short carbon fibres at a time in the form of rods or needles, a reinforcing element is provided in the form of the carbon fibre rods or needles which have a size and strength comparable to and superior to, respectively the size and strength of the coke grist particles so that the rods or needles are able to survive, without breakage, the disorientation process of being mixed and ground together with the grist and binder. The presence of these unbroken rods or needles in the final heat treated artefact confers enhanced resistance to mechanical or thermal shock by binding together all the components into a closely knit composite.

In the artefacts of the invention, although it is thought that some sintering may occur between the carbon fibre rods or needles and the coke grist if the artefact is graphitised, it is believed that the rods or needles retain their identity, thus the carbonised/graphitised artefact is a carbon/carbon composite.

The following Example illustrates the invention.

EXAMPLE

A 2000 filament tow of Courtauls "Grafil" type A long staple carbon fibre is saturated with a phenolic resin and pulled through a die to form the filaments into a thin rod of 0.2 mm diameter and to remove the excess resin. The rod is cured in a hot air oven and cut into 5 mm lengths. The rods are incorporated with vigorous mixing in an amount of 1 part by weight into a mixture of 24 parts by weight pitch binder having a softening temperature of 106° C (R. & B) and crushed to less than 212 $\mu$m mesh and 75 parts by weight coke grist which had been calcined at 1300° C and ground so that about 50% by weight passes through 75 $\mu$m mesh sieve. 20g of the mixture is charged to a cylindrical mould of 31 mm diameter, maintained at 175° C by a heated jacket and compressed to a total loading of 6 tons using a hydraulic press. After pressing the mould is cooled using a water cooling jacket while maintaining the loading.

The resulting artefact is carbonised in a nitrogen atmosphere by heating to a temperature of 1000° C, then further heating under argon to 2700° C to graphitise it.

The graphitised artefact has a resistivity of 20 $\mu\Omega$M and a tensile strength of 4.01 N mm$^{-2}$.

We claim:
1. A composite carbon artefact comprising 15-35% carbonised binder, 15-84% calcined coke grist and 1-50% of disoriented carbon fibre rods composed of carbon fibres in a carbonised matrix.
2. An artefact as claimed in claim 1, wherein the artefact is graphitised.
3. An artefact as claimed in claim 1, wherein the carbon fibre rods are present in an amount of 1 to 20% by weight of said mixture.
4. An artefact as claimed in claim 3, wherein the carbon fibre rods comprise more than 50% by volume of carbon fibre.
5. An artefact as claimed in claim 4, wherein the matrix for the carbon fibre rod prior to carbonisation was a cured thermosetting resin.
6. An artefact as claimed in claim 1, wherein the carbonised binder prior to carbonisation had a softening point of from 100° to 140° C.
7. A method for the production of a composite carbon artefact comprising mixing 15-35% of a carbonisable binder, 15-84% calcined coke grist and 1-50% carbon fibre rods composed of carbon fibres in a hardened matrix, shaping the resultant mixture into an artefact and carbonising the binder in the shaped artefact to form the composite carbon artefact.

* * * * *